US008775437B2

(12) United States Patent
Weitz et al.

(10) Patent No.: US 8,775,437 B2
(45) Date of Patent: Jul. 8, 2014

(54) DYNAMIC RERANKING OF SEARCH RESULTS BASED UPON SOURCE AUTHORITY (75) Inventors: Stefan David Weitz, Seattle, WA (US); Alexander George Gounares, Kirkland, WA (US); Patrick A. Kinsel, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 177 days.

(21) Appl. No.: 12/752,149

(22) Filed: Apr. 1, 2010

(65) Prior Publication Data
US 2011/0246456 A1 Oct. 6, 2011

(51) Int. Cl.
G06F 7/00 (2006.01)

(52) U.S. Cl.
USPC ............................................................. 707/748

(58) Field of Classification Search
USPC .................... 707/723, 748, 737, 741, 999.003
See application file for complete search history.

(56) References Cited

U.S. PATENT DOCUMENTS

| 6,112,202 | A  | * | 8/2000 | Kleinberg ............................... 1/1 |
| 6,275,820 | B1 | * | 8/2001 | Navin-Chandra et al. ............. 1/1 |
| 6,356,899 | B1 | * | 3/2002 | Chakrabarti et al. ......... 707/737 |
| 8,145,623 | B1 | * | 3/2012 | Mehta et al. .................. 707/713 |
| 2002/0198866 | A1 | * | 12/2002 | Kraft et al. ........................ 707/3 |
| 2003/0101176 | A1 | * | 5/2003 | Kelkar ............................... 707/6 |
| 2003/0225750 | A1 | * | 12/2003 | Farahat et al. .................... 707/3 |
| 2003/0226100 | A1 | * | 12/2003 | Farahat et al. ................. 715/500 |
| 2006/0026147 | A1 | * | 2/2006 | Cone et al. ........................ 707/3 |
| 2007/0192306 | A1 | * | 8/2007 | Papakonstantinou et al. .... 707/5 |
| 2007/0214131 | A1 | * | 9/2007 | Cucerzan et al. ................. 707/5 |
| 2007/0255731 | A1 | * | 11/2007 | Maze ............................. 707/100 |
| 2007/0294225 | A1 | * | 12/2007 | Radlinski et al. .................. 707/3 |
| 2008/0133585 | A1 | * | 6/2008 | Vogel et al. .................... 707/102 |
| 2008/0281810 | A1 | * | 11/2008 | Smyth et al. ....................... 707/5 |
| 2009/0119278 | A1 | * | 5/2009 | Cross et al. ....................... 707/5 |
| 2009/0125511 | A1 | * | 5/2009 | Kumar .............................. 707/5 |
| 2009/0182723 | A1 |   | 7/2009 | Shnitko et al. |
| 2009/0271391 | A1 |   | 10/2009 | Kawale et al. |
| 2009/0319518 | A1 |   | 12/2009 | Koudas et al. |
| 2010/0063878 | A1 | * | 3/2010 | Bachet et al. .............. 705/14.49 |
| 2010/0094840 | A1 | * | 4/2010 | Donnelly et al. ............. 707/705 |
| 2010/0185611 | A1 | * | 7/2010 | Liao et al. ..................... 707/728 |

OTHER PUBLICATIONS

Jose Borbinah, Nuno Freire, Mari Silva, Bruno Martins, Internet Search Engines and OPACs: Getting the best of two worlds, 2003, National Library of Portugal, p. 325-334.*

(Continued)

*Primary Examiner* — Mohammed R Uddin
(74) *Attorney, Agent, or Firm* — Doug Barker; Dan Choi; Micky Minhas (57) ABSTRACT Concepts and technologies are described herein for dynamically reranking search results based upon source authority. A search query is received and analyzed. One or more topics are identified in the search query. An authority index is searched to identify authoritative sources for content relating to the identified topic(s). Promoted results corresponding to content generated by the authoritative sources relating to the identified topics are obtained. The promoted results can be presented to an entity requesting the search, or injected into search results. Contribution dimensions associated with the promoted results can be determined, and filters based upon the contribution dimensions can be generated and used by an entity to dynamically manipulate the search results.

15 Claims, 6 Drawing Sheets (56) References Cited

OTHER PUBLICATIONS

Ding, et al., "AuthorRank: Ranking Improvement for the Web", Retrieved at <<http://www.scharffe.fr/pub/author-RankRankingImprovementForTheWeb.pdf>>, Oct. 12, 2007, pp. 7.

Bogers, et al., "Authoritative ReRanking in Fusing Authorship Based Subcollection Search Results", Retrieved at <<http://ilk.uvt.nl/~toine/publications/bogers.2006.dir2006-paper.pdf>>, Jan. 13, 2010, pp. 7.

Harth, et al., "Using Naming Authority to Rank Data and Ontologies for Web Search", Retrieved at <<http://sw.deri.org/2007/03/tensor/iswc2009.pdf>>, Jan. 15, 2010, Proceedings of the 8th International Semantic Web Conference Lecture Notes in Computer Science, vol. 5823, pp. 16.

* cited by examiner

| SOURCE | TOPIC | AUTHORITY | POV | TIME | OTHER |
|---|---|---|---|---|---|
| 1 | 75 | 30 | 80 | 1/1/2009 | POSITIVE COMMENT ON COMPWORLD.COM |
| 1 | 75 | 70 | 70 | 10/1/2009 | BLOG POST ON MSBLOG.COM AUTHORED BY ME |
| 2 | 75 | 10 | 100 | 6/1/2009 | TWITTER UPDATE POINTING TO COMPWORLD.COM ARTICLE |
| 3 | 75 | 80 | 20 | 3/1/2009 | NEGATIVE BLOG POST AT TECHCRUNCH.COM WITH 100 COMMENTS |

DYNAMIC RERANKING OF SEARCH RESULTS BASED UPON SOURCE AUTHORITY

BACKGROUND

As the amount of content accessible via the Internet continues to grow, the importance of accurate and thorough web search capabilities continues to increase. Web search engines are used to identify documents on the Internet that satisfy a submitted query. In response to the query, the web search engines generate search results, often arranged in order of relevance, and present the search results to a user. The user is then able to follow links to the content represented by the search results, if desired.

The current state of web search relies heavily on explicit data about documents being retrieved, for example, anchor text, meta tags, the popularity of a site linking to or hosting the retrieved documents, keywords identified in the retrieved documents and/or surrounding links to the retrieved documents, and the like. While using explicit data may be sufficient for identifying documents relating to particular subject matter, the use of such explicit data by a search engine may not yield the most relevant and/or authoritative documents available. Furthermore, the use of explicit data such as keywords, anchor text, and/or the like, allow content sources to manipulate search results by artificially increasing the perceived relevance of a document.

It is with respect to these and other considerations that the disclosure made herein is presented.

SUMMARY

Concepts and technologies are described herein for dynamically reranking search results based upon source authority. According to some embodiments, a search query is received and analyzed and one or more topics are identified in the search query. An authority index is searched to identify authoritative sources for content relating to the identified topic(s). Promoted results corresponding to content generated by the authoritative sources relating to the identified topics are obtained.

The promoted results are presented to an entity requesting the search, or are injected into search results. Contribution dimensions associated with the promoted results can be determined, and filters based upon the contribution dimensions can be generated and selectively applied to the search results by an entity to dynamically manipulate the search results. Dynamic manipulation of the search results can include ranking and/or reranking the search results based upon one or more contribution dimensions. The ranked and/or reranked results are presented to an entity that requested the search.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

The following detailed description is directed to technologies for dynamically reranking search results based upon source authority. While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and in which are shown by way of illustration specific embodiments or examples. Referring now to the drawings, in which like numerals represent like elements throughout the several figures, aspects of a computing system, computer-readable storage medium, and computer-implemented methodology for dynamically reranking search results based upon source authority will be presented.

As used herein, the term "authority," and variants thereof, is used to refer to sources that are perceived as being trustworthy, reliable, respected, or otherwise authoritative with respect to a particular topic. The indication that a source is deemed authoritative may be determined based upon various data relating to the source, e.g., how many degrees are held by the source, where the degrees were obtained, citations of the source in scholarly or technical works, and the like. Additionally, the authority of a source may be described with an authority score or authority value, and may be stored at and/or retrieved from a data storage device. While popularity of a source may be considered in determining the authority of a source, the authority of a source may not be limited to simple popularity of the source or content associated with the source.

Figure 1:
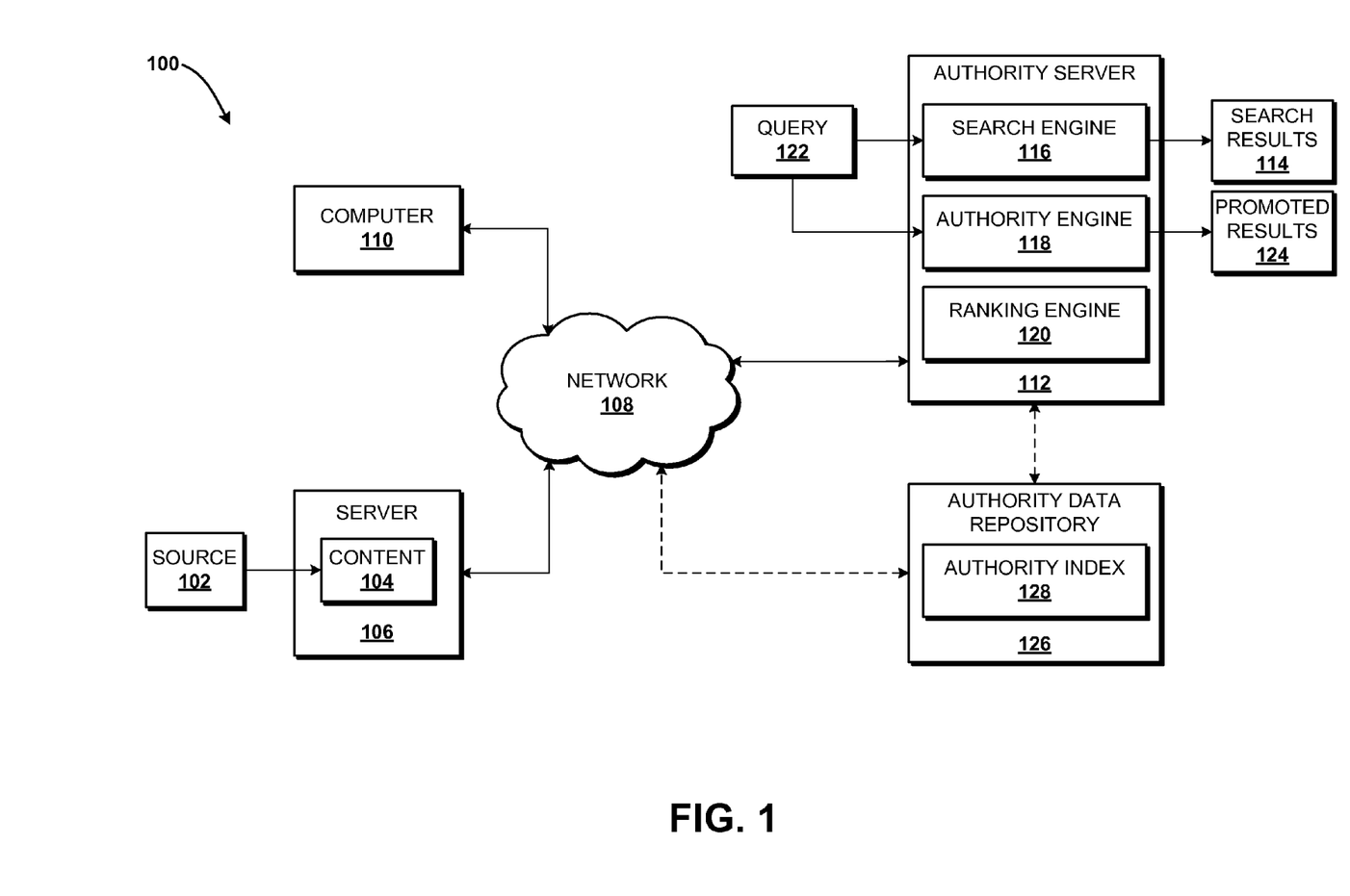
FIG. 1 is a system diagram illustrating an exemplary operating environment for the various embodiments disclosed herein.

Referring now to FIG. 1, aspects of one operating environment 100 for the various embodiments presented herein will be described. The operating environment 100 shown in FIG. 1 includes a source 102 that generates content 104. The source 102 can include, but is not limited to, an individual, software, an organization, an institution, a group of individuals and/or institutions, a company, a business, a university, a think-tank, a government entity, combinations thereof, and the like. The content 104 can include, but is not limited to, files, folders, presentations, articles, internet content, videos, audio files, documents, editorials, program output, data, services, combinations thereof, and the like. Thus, the content 104 can include almost any type of data or service, and the content 104 can be generated by almost any type of entity. The content 104 is hosted on a server 106 that operates on or in communication with a network 108. The server 106 can be a web server that is accessible via the Internet, can host data such as the content 104, and can allow users or devices connecting to the server 106 to access the content 104.

A computer 110 can be in communication with the network 108 and/or devices operating on or in communication with the network 108 such as the server 106. According to various embodiments, the computer 110 is a standard desktop or laptop personal computer system. It should be appreciated, however, that the computer 110 may include other types of computing systems including, but not limited to, server computers, handheld computers, netbook computers, tablet computers, embedded computer systems, video game consoles, personal digital assistants, mobile telephones, smart phones, or other computing devices.

For the sake of clarity, FIG. 1 illustrates one source 102, one content 104, one server 106, one network 108, and one computer 110. It will be understood, however, that some implementations of the operating environment 100 include multiple sources 102, multiple content 104, multiple servers 106, multiple networks 108, and multiple computers 110. In some implementations, one of the networks 108 is the Internet. As such, some implementations of the operating environment 100 include content 104 corresponding to millions of Internet files created by one or more of millions of sources 102 of Internet content. The content 104 is hosted on one or more of the millions of servers 106 and/or computers 110 in communication with the Internet.

The operating environment 100 further includes an authority server 112 operating on or in communication with the network 108. The authority server 112 includes one or more software modules for providing dynamic reranking of search results 114 based upon source authority, as described herein. The software modules include, but are not limited to, a search engine 116, an authority engine 118, and a ranking engine 120. It should be understood that the functionality of the search engine 116, the authority engine 118, and the ranking engine 120 may be provided by one or more program modules. Furthermore, it should be understood that the respective functionality of each of the search engine 116, the authority engine 118, and/or the ranking engine 120, can each be provided by separate computers or servers (not illustrated).

The search engine 116 is configured to receive search queries 122 from a requesting entity, such as a user of the computer 110, to identify one or more topics in the search queries 122, and to return search results 114 relating to the topic(s) to the requesting entity. The search engine 116 can generate the search results 114 without regard to the authority of sources 102 associated with the search results 114. The authority engine 118 is configured to identity authoritative sources 102 of content 104 corresponding to the topic(s) identified by the search engine 116, and to generate promoted results 124. "Promoted results," as used herein, are content 104 that is generated or consumed by a source 102 that is recognized by the authority server 112 as authoritative. The authority engine 118 is further configured to output the promoted results 124 to the search engine 116 and/or the ranking engine 120.

The ranking engine 120 is configured to output the promoted results 124 alone, or in combination with the search results 114. In some embodiments, the ranking engine 120 is configured to dynamically rerank the search results 114 identified by the search engine 116 by injecting the promoted results 124 identified by the authority engine 118 into the search results 114, by generating filters manipulable by the requesting entity to dynamically rerank the search results 114 and/or the promoted results 124, and/or by outputting the promoted results 124 ranked according to desired criteria. These and other functions of the authority server 112 will be described in more detail below with reference to FIGS. 2-5.

The authority server 112 includes or is in communication with a data storage device configured to store authority data. In the illustrated implementation, the authority server 112 is in communication with an authority data repository 126 (ADR) that is configured to store an authority index 128. The authority index 128 stores authority data for one or more sources 102, as will be explained in more detail below with reference to FIG. 2. The authority server 112 can communicate with the ADR 126 directly and/or via the network 108.

In operation, the authority server 112, or more particularly the search engine 116, receives a search query 122 from an entity. The search engine 116 is configured to analyze search queries 122 to identify topics and/or keywords within the queries 122. The search engine 116 constructs and executes a search based, at least partially, upon the identified topics and/or keywords identified in the submitted query 122. The search engine 116 generates search results 114 for presentation to the requesting entity. The search results 114 identify content 104 that relates to the topics identified in the search query 122.

In accordance with various concepts disclosed herein, the authority server 112 is further configured to identify authoritative sources 102 for content 104 associated with the topic(s) identified by the search engine 116, in response to receiving a search query 122. It should be understood that the search engine 116 and the authority engine 118 may be executed in parallel by the authority server 112 or by multiple computers or servers. Thus, each of the search engine 116 and the authority engine 118 may receive the search query 122. The search engine 116 can generate search results 114, as described herein, and the authority engine can generate promoted results 124, as described herein. In the illustrated embodiment, the search engine 116 identifies topics in the search query 122 and generates search results 114, and passes the topics to the authority engine 118.

The authority server 112, or more particularly the authority engine 118, is configured to access the authority index 128 stored at the ADR 126, and to search the authority index 128 to identify authoritative sources 102 associated with the topics identified in the search query 122. If the authority index 128 includes one or more sources 102 that are recognized as authoritative with respect to one or more topics identified in the search query 122, the authority engine 118 obtains data indicating the authoritative sources 102, the respective topics addressed by the authoritative sources 102, descriptions and/or links to content 104 authored or potentially consumed by the authoritative sources 102, and/or other data describing the content 104 and/or the authoritative sources 102. For each identified content 104 associated with the authoritative sources 102, the authority engine 118 returns a promoted result 124. The authority server 112 can use the data included in the promoted result 124 to generate filters for affecting the ranking of the search results 114, and/or can inject the promoted results 124 into the search results 114.

The authority server 112, or more particularly, the ranking engine 120, is configured to use the promoted results 124 identified by the authority engine 118, to dynamically rerank the search results 114 generated by the search engine 116. In some implementations, the authority server 112 injects the promoted results 124 into the search results 114. In some embodiments, the authority server 112 generates filters that are manipulable by an entity to dynamically rerank the search results 114 by taking into account various aspects, i.e., contribution dimensions, of the promoted results 124. For example, filters may be generated to rerank results based upon authority, point-of-view ("POV"), time, geographic location, relevance, and/or other aspects of the promoted results 124, wherein the aspects can relate to the source 102 in general, and/or content 104 corresponding to the promoted results 124. Thus, the authority server 112 can dynamically rerank the search results 114, and/or can enable a searching entity to dynamically rerank the search results 114.

It should be appreciated that the operating environment 100 illustrated in FIG. 1 is one embodiment of a suitable operating environment. Other operating environments for providing the functionality disclosed herein may be utilized. Additional details regarding the operation of the authority server 112 will be provided below with reference to FIGS. 2-5.

Figure 2:
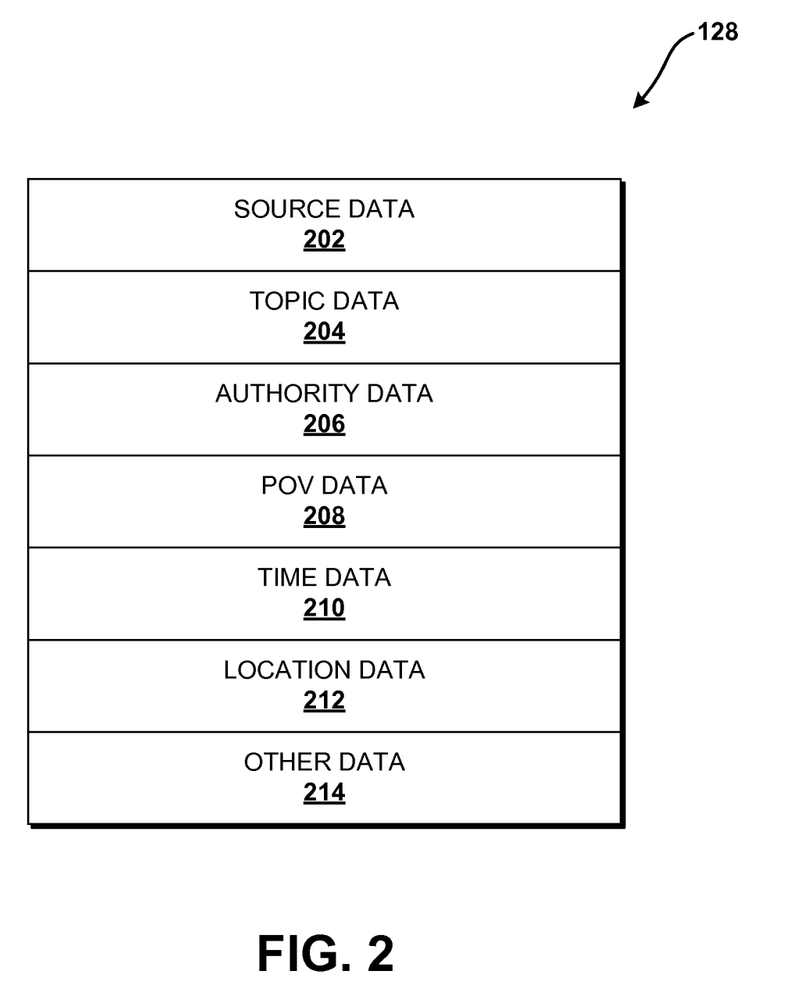
FIG. 2 is a data structure diagram illustrating a data structure of data stored in an authority index, according to an exemplary embodiment of the present disclosure.

Turning now to FIG. 2, additional aspects of the authority index 128 are described. In particular, FIG. 2 is a data structure diagram illustrating data 200 stored in the authority index 128, according to an exemplary embodiment of the present disclosure. It should be understood that the illustrated data 200 is exemplary, and should not be construed as being limiting in any way. The data 200 stored at the authority index 128 describes the sources 102 and the content 104. It should be understood that the authority index 128 can be generated at any time, and can store data 200 relating to any number of sources 102 of content 104.

In some embodiments, the data 200 stored at the authority index 128 is generated by entities and/or software by searching networks such as the Internet for content 104, retrieving the content 104, identifying one or more sources 102 for the content 104, identifying one or more topics related to the content 104, analyzing the content 104 to identify one or more POV's associated with the content 104, determining time and/or location information associated with the content 104, obtaining or determining other data associated with the content 104, and storing the obtained, determined, and identified information in the authority index 128. The data 200 stored at the authority index 128 includes source data 202, topic data 204, authority data 206, POV data 208, time data 210, location data 212, and/or other data 214.

The source data 202 identifies one or more authoritative sources 102 of content 104. The source data 202 can include a name of the source 102, an Internet protocol ("IP") address associated with the source 102, a domain name or uniform resource locator ("URL") associated with the source 102, an organization, company, institution, group, or individual associated with the source 102, other entities associated with the source 102, combinations thereof, and the like. In some embodiments, the source data 202 is explicitly set forth in content 104, for example, by way of an element in a file header such as a hypertext markup language ("HTML") or extensible HTML ("XHTML") structure. Suitable structures include, but are not limited to, meta tags such as the <META name="Author" content="source">tag, wherein the "source" may be defined as the source 102. Meta tags, as well as other structures, may be recognized by the authority server 112 and/or the search engine 116. Additionally, or alternatively, content 104 can include an explicit author or source identification, for example, a byline of an article that identifies an author, an institution, a publication, a domain name, or another source 102 as defined herein.

In some embodiments, the source data 202 is not explicitly set forth in the content 104. Thus, the source data 202 may be determined based upon other information identified in the content 104 and/or from contextual information relating to the content 104. For example, the source data 202 can be determined based upon a domain name from which the content 104 is retrieved, an institution associated with the content 104, a geographic location associated with the content 104, and the like. Regardless of how the source data 202 is obtained, the source data 202 may be stored at the authority index 128. In some embodiments, the source data 202 refers to a source 102 that has consumed the content 104. Consumption of content 104 by a source 102 deemed to be authoritative can be understood by the authority server 112, or any other entity generating the authority index 128, as indicating that the content 104 is authoritative. In some embodiments, the source 102 that consumed the content 104 is associated with the content 104 in the authority index 128 merely by virtue of the consumption of the content 104 by the source 102.

The topic data 204 identifies one or more topics addressed by a source 102. In particular, the topic data 204 identifies one or more topics the source 102 has addressed in the content 104. It will therefore be understood that a particular source 102 may address many topics. In some embodiments, the topic data 204 is explicitly presented in content 104 associated with the source 102, or is determined based upon the context of the content 104 as explained above. For example, content 104 associated with the source 102 may be analyzed to determine topics addressed by the source 102, and the topics can be stored as topic data 204.

The authority data 206 identifies the authority of the source 102, and can be identified for more than one topic and/or POV. The authority data 206 can include any representation of authority of the source 102, and can be determined according to multiple methodologies. While the determination of authority of a particular source 102 will not be described in detail herein, it should be understood that the authority of a source 102 can be determined using complex formulae based upon various objective and/or subjective data. Exemplary formulae can include, but are not limited to, weighted and unweighted parameters relating to numbers of publications associated with a source 102, a number of social network connections and/or followers, a number of posts relating to the source 102 and/or a particular topic addressed by the source 102, a number of patents held by the source 102, a number of links to content 104 associated with the source 102, a number of articles citing work associated with the source 102, one or more ratings associated with the source 102, and the like. These, as well as other, formulae can be used to generate an objective authority value, i.e., authority score, for the source 102 in general, and/or with respect to a particular topic, time, location, content 104, POV, and the like. Regardless of how the authority data 206 is calculated, the authority data 206 can be stored at the authority index 128 and can be associated with the source 102.

The POV data 208 identifies a POV, i.e., a sentiment, of the source 102 with respect to a particular topic. The POV data 208 can be determined based upon explicit and/or implicit data included in content 104 associated with the source 102. The POV data 208 may be determined by parsing content 104 associated with a source 102. For example, content 104 associated with the source 102 can be analyzed using various tools such as natural language searching and the like to determine a sentiment of the source 102 with respect to a particular topic addressed in the content 104. Statements such as "this is a great idea," "I don't like this idea," "he's out of his mind," or other subjective statements, may be recognized and categorized as POV data 208. The POV data 208 may be determined as any desired POV including, but not limited to, positive, negative, neutral, agitated, happy, upset, sarcastic, combinations thereof, and the like. It should be understood that the POV data 208, in combination with the topic data 204 and the source data 202, may indicate how a particular source 102 treats a particular topic in a particular content 104.

The time data 210 identifies a time associated with the source 102. The time data 210 may be defined in any desired units including, but not limited to, time of day, time after a particular event, a date, a month, a year, or other desired time increments. The time data 210 can be used to further define authority of a source 102 with respect to a particular topic, POV, content 104, location, other information, and the like. Authority on a particular topic can change over time. For example, a source 102 may be considered the foremost expert on a particular topic at one time, but his or her expertise may be surpassed by another source 102 at another time. Thus, the time data 210 can be used to further define authority within a specified time frame. This example is merely illustrative of how time data 210 may be used to further refine authority of a source 102 with respect to a particular topic, and should not be construed as being limiting in any way.

The location data 212 identifies a location associated with the source 102 and/or content 104 associated with the source 102. For example, if content 104 associated with the source 102 is associated with a particular university, the geographic location of the university may be indicated by the location data 212. Additionally, or alternatively, if content 104 associated with the source 102 describes a particular location, the location data 212 can include an indication of the location addressed by the content 104. Additionally, if content 104 associated with the source 102 is generated at a particular location, the location data 212 can include an indication of that location. The location data 212 can therefore be used by the authority server 112 to define authority of a source 102 with respect to a location.

The location data 212 may be used in conjunction with other types of data stored at the authority index 128 to identify authoritative sources 102 and/or content 104. For example, if a searching entity wishes to identify an expert on immigrant life in New York City during the Great Depression, the topic data 204, the location data 212, and the time data 210 may be used. The topic data 204 may be used to identify a source 102 that is considered authoritative on immigrant life. The time data 210 may be used to identify sources 102 who lived during the Great Depression, i.e., a particular time. The location data 212 may be used to identify sources 102 who are associated with New York City, i.e., a particular location. The source 102 that satisfies all three data can be considered the most authoritative source for this particular application. It should be understood that if more than one source 102 meeting the topic, time, and location criteria are satisfied, the authority data 206 may be used to identify the most authoritative source 102. This example is merely illustrative of how topic data 204, authority data 206, time data 210, and location data 212 may be used to further refine authority of a source 102 with respect to a particular topic, time, and location, and should not be construed as being limiting in any way.

Authority of a source 102 can vary with respect to location. For example, if content 104 associated with a source 102 is directed to a subject associated with a location, e.g., a historical event, a sports event, a culture associated with a particular location, a news event, or the like, the source 102 may be considered more authoritative if the source 102 is located at or near the location associated with the subject. In some instances, a source 102 may be considered more authoritative if he or she is remote from the location. Regardless of exactly how the location data 212 is used, it should be understood that authority of a source 102 can vary with respect to location.

The other data 214 can include various other data associated with the source 102 and/or content 104 associated with the source 102. The other data 214 can include, but is not limited to, a gender of the source 102, a country of origin associated with the source 102, a language associated with the source 102 and/or content 104 associated with the source 102, entities and/or other sources 102 related to the source 102, an indication of a type of content 104 associated with the source 102, ranking or rating data, pseudoURL's, descriptions of content 104, and the like. Ranking and ratings can include ratings or rankings of the source 102, e.g., poll results from a poll of others in the field, rankings of top experts, and the like. PseudoURL's can describe or provide links to content 104 associated with the source 102. Thus, as explained below, a pseudoURL can include data that identifies content 104 relating to a source 102, describes the content 104 relating to the source 102, and/or may be used to link data stored in the authority index 128 with the source 102 and/or content 104. Descriptions of content 104 can include statistics associated with the content 104, e.g., a number of words in the content 104, a version number associated with the content 104, a copyright date of the content 104, and/or other information. The other data 214 can be used to associate content 104 with a source 104, a topic, a POV, an authority value, a time, a location, and/or other data.

It should be understood that a particular source 102 can be considered authoritative with respect to one or more topics, but may not be considered authoritative with respect to other topics. Similarly, the source 102 can be considered authoritative with respect to one or more times and/or locations, but may not be considered authoritative with respect to other times and/or locations. Thus, a particular source 102 can be represented one or more times in the authority index 128. The source 102 may be associated with more than one topic data 204, more than one POV data 208, more than one authority data 206, more than one time data 210, more than one location data 212, and/or more than one other data 214. It should therefore be understood that the source 102 may be associated with more than one authority value, as represented by the authority data 206.

Figure 3A:
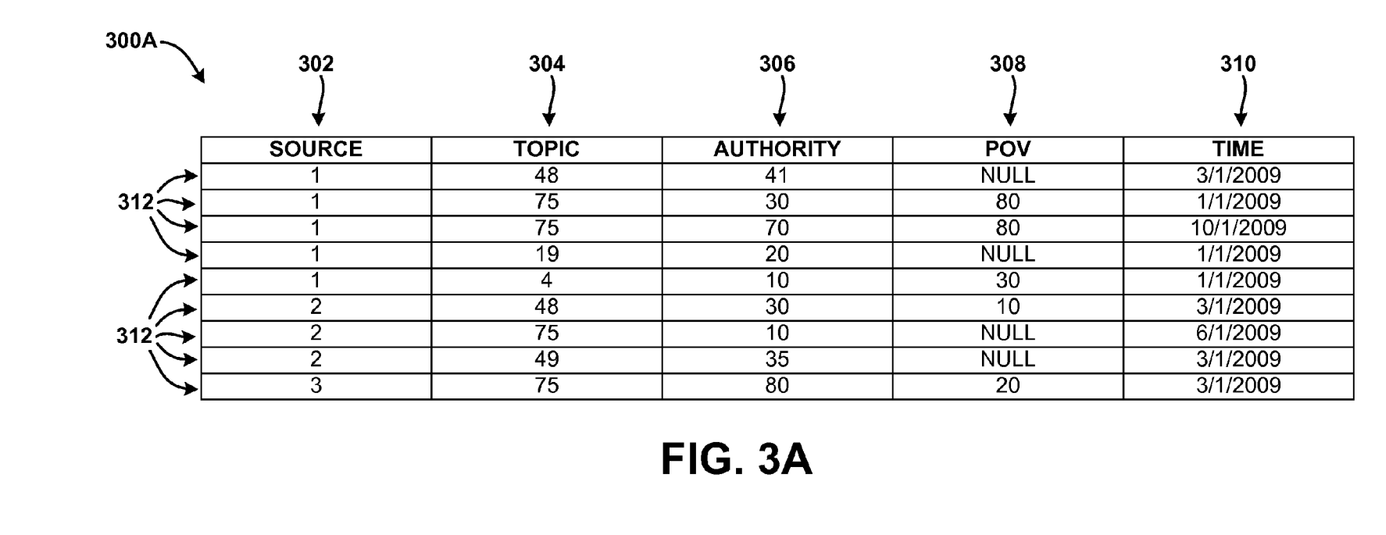
FIGS. 3A-3C illustrate authority tables, according to exemplary embodiments of the present disclosure.
Figure 3B:
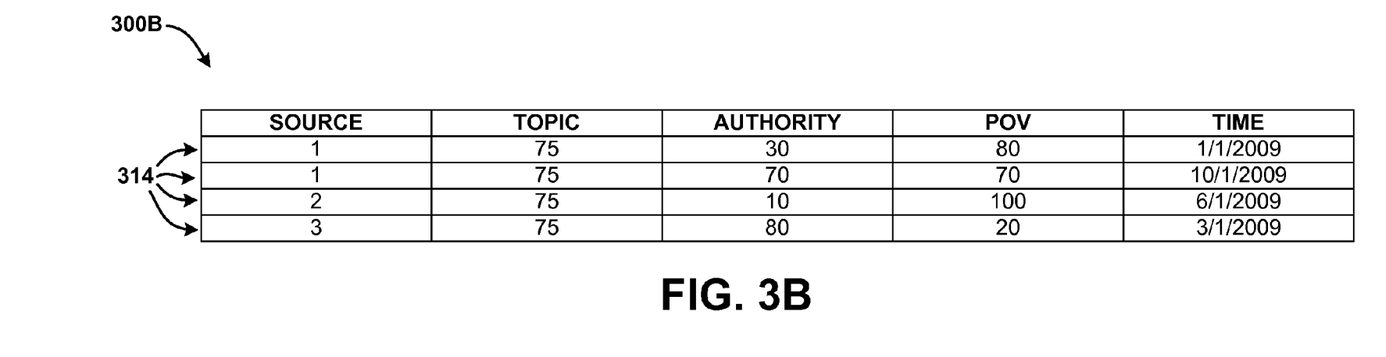
Figure 3C:
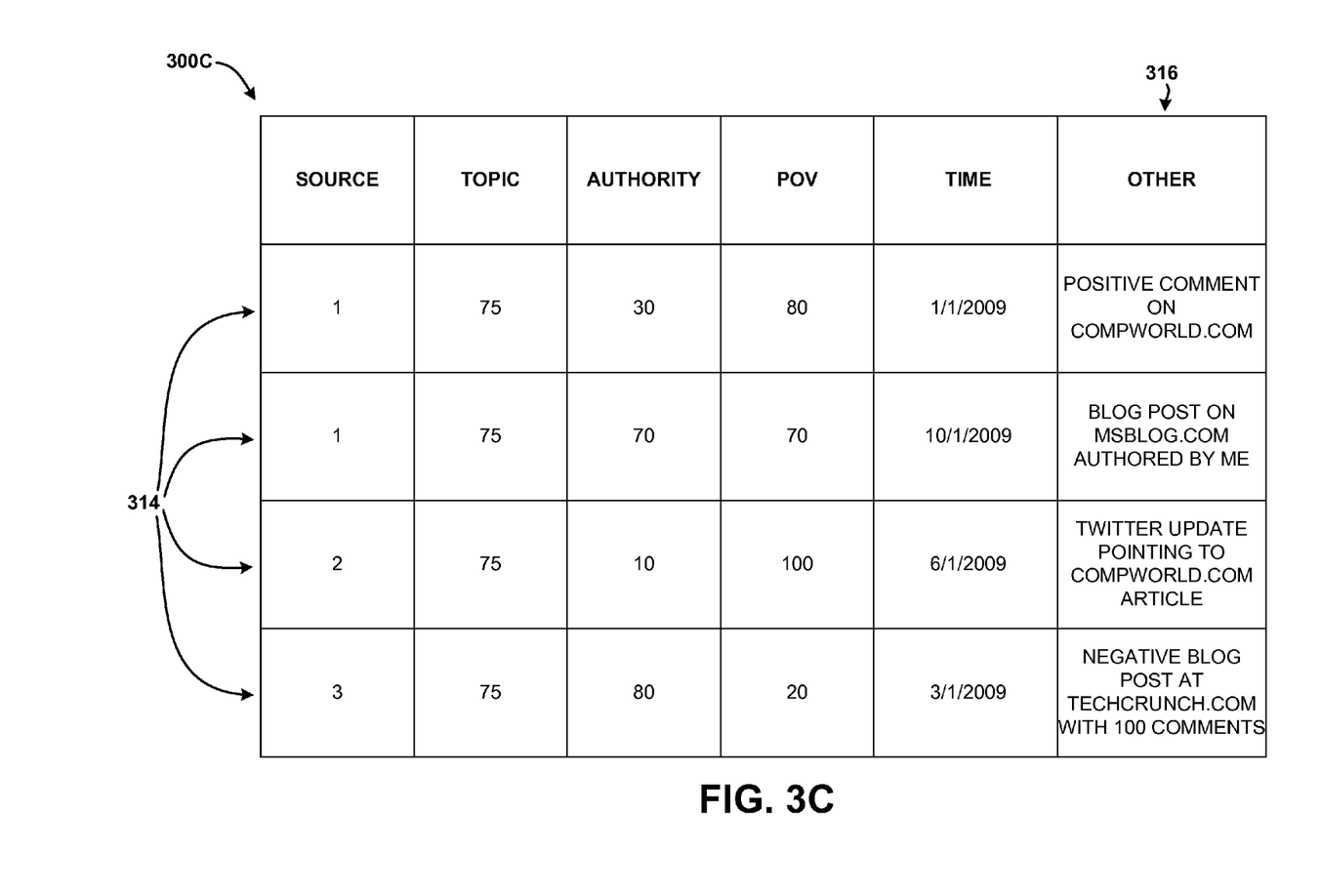

Turning now to FIGS. 3A-3C, a method for using the authority index 128 will be described. FIG. 3A schematically illustrates an authority table 300A, according to an exemplary embodiment of the present disclosure. It should be understood that the authority table 300A may include millions of data entries. The illustrated authority table 300A may therefore represent a truncated representation of an exemplary authority table 300A, and is provided for purposes of clarifying the concepts disclosed herein.

Additionally, it should be understood that the data stored in the authority tables 300A-300C illustrated in FIGS. 3A-3C may be stored in a short form, as illustrated herein. Short forms of the data may be mapped to other data stored in the authority index 128 and/or additional data storage devices (not illustrated). For example, the source "1" illustrated in FIGS. 3A-3C may be mapped to or correspond to a source such as "http://research.microsoft.com/en-us/um/citrin/publications/2012/authority.html." Thus, the data illustrated in FIGS. 3A-3C should be understood to be exemplary.

The authority table 300A includes data describing sources 102, for example, data included in the authority index 128 described and illustrated above with reference to FIGS. 1 and 2. The authority table 300A can be generated at any time, and can be stored at a data storage device. In some embodiments, the authority table 300A includes the data stored in the authority index 128, and is periodically updated. In other embodiments, the authority table 300A is built by the authority engine 118 in response to a search performed by the search engine 116. In the illustrated embodiment, the authority index 128 stores the data 200 in a database or table, a portion of which is illustrated in the authority table 300A.

The authority table 300A is illustrated as storing data organized into a source column 302, which contains the source data 202 described above. The authority table 300A also includes a topic column 304, which contains the topic data 204 described above, an authority column 306, which contains the authority data 206 described above, a POV column 308, which contains the POV data 208 described above, and a time column 310, which contains the time data 210 described above. The authority table 300A can include additional columns (not illustrated), which can include data relating to various types of authority index 128 such as, for example, the location data 212 and the other data 214 described above. It should be understood that the illustrated authority table 300A is exemplary.

The authority table 300A stores a number of records 312, wherein each record 312, i.e., each row, corresponds to content 104 associated with a source 102. Furthermore, each record 312 can, upon being identified as satisfying a search query 122, correspond to a promoted result 124. As illustrated, the authority table 300A can include multiple records 312 corresponding to the same source and/or topic. For example, the authority table 300A include five records 312 identifying "1" as the source 102. Similarly, the authority table 300A includes four records 312 identifying "75" as the topic and two records 312 identifying "48" as the topic. It should be understood that for a particular topic, there may be only one record 312 in the authority index 128, or there may be more than one record 312 in the authority index 128. Therefore, it should be understood that for a particular topic, one or more authoritative sources 102 may be represented in the authority index 128.

As explained above, the authority server 112 receives a search query 122, and the search engine 116 analyzes the query 122 to determine topics and/or other search parameters, performs the search, and obtains search results 114. According to various embodiments of the present disclosure, the search engine 116 passes the determined topics to the authority engine 118, which searches the authority index 128 stored at the ADR 126 to determine if authoritative sources 102 are associated with content 104 relating to the topic(s) identified by the search engine 116. It should be understood that the authority engine 118 also may search the authority index 128 based upon time, location, or other information in addition to, or instead of, searching the authority index 128 based upon topics. The authority engine 118 can search the authority table 300A for the topics, and obtain records 312 that are directed to the topics, as illustrated in FIG. 3B.

FIG. 3B illustrates an authority table 300B representing promoted result records 314 retrieved by searching the authority table 300A for the topic "75." The promoted result records 314 can include data corresponding to the promoted results 124. Three sources 302 are identified in the promoted result records 314. Additionally, the authority values represented in the authority column 306 range from 10 to 80, and the point of view values represented in the POV column 308 range from 20 to 100. The time values represented in the time column 310 range from January, 2009 through October, 2009, i.e., nearly a year. In other words, each of the promoted result records 314 in the authority table 300B corresponds to content 104 associated with the topic "75," but the promoted result records 314 correspond to content 104 associated with three different sources 102, a wide range of authority values, a wide range of point of view values, and a wide range of time values. These varying values allow manipulation and/or filtering of the promoted result records 314, in combination with search results 114, if desired, to focus on one or more aspects of the promoted result records 314 to which the authority server 112 and/or a user of the authority server 112 assigns importance. As such, the promoted result records 314 may be inserted into search results 114 or otherwise ranked in various orders depending upon what a user and/or the authority server 112 places the most weight upon, i.e., the source, the authority, the point of view, and/or the time, as will be explained below with reference to FIG. 4.

FIG. 3C illustrates an authority table 300C that includes a column 316, corresponding to the other data 214 discussed above. In the illustrated embodiment, the other column 316 includes a pseudoURL for each promoted result record 314. The pseudoURL identifies content 104 relating to the promoted result record 314, thereby linking the data in the source column 302, topic column 304, authority column 306, POV column 308, time column 310, and/or additional or alternative columns (not illustrated) with content 104. The authority server 112 can present the promoted result records 314 with the search results 114 determined by the search engine 116.

In some embodiments, the promoted result records 314 are injected into the search results 114 by the authority server 112. The authority server 112 can inject the promoted result records 314 based upon specified criteria, e.g., default rules for returning the promoted result records 314, search preferences, and/or other criteria. In some implementations, for example, the promoted result record 314 with the highest authority value, as represented by the authority data 206 in the authority column 306, are ranked highest. In some implementations, the promoted result records 314 with the latest date, i.e., the most recent time data 210 in the time column 310 are ranked highest. In some implementations the promoted result record 314 with the most positive, negative, or neutral POV data 208 in the POV column 308 are rated highest. These criteria are exemplary, and do not constitute an exhaustive list of possible criteria for weighting the promoted result records 314.

In some embodiments, the promoted result records 314 are injected into the search results 114 based upon user input. A user can specify one or more criteria, and the relative importance of those criteria. For example, a user may indicate that he or she is looking for content 104 from an authoritative source 102 that is the most negative with respect to a particular topic. In response to this indication, the authority server 112 can inject the promoted result records 314 with the lowest POV data 208 in the POV column 308 as the highest ranked search result 114. Similarly, a user may indicate that he or she is looking for content 104 from an authoritative source 102 with the highest authority value and the most neutral POV value. In response to this indication, the authority server 112 can inject the promoted result record 314 that collectively has the highest authority value stored as the authority data 206 in the authority column 306, and the most neutral POV data 208 in the POV column 308.

As will be explained in more detail below with reference to FIG. 4, the authority server 112 can generate filters based the data included in the promoted result records 314. These filters can be based upon any aspects, i.e., contribution dimensions, of the data included in the promoted result records 314. These filters can be presented to the entity that requested the search for manipulation to dynamically rerank the search results 114. The searching entity can choose whether and how to weight any desired aspects of the promoted result records 314 to rerank search results 114. With respect to the promoted result records 314 of FIG. 3C, the searching entity can filter the search results 114 based upon source, topic, authority, POV, time, and/or the other data, if desired.

Figure 4:
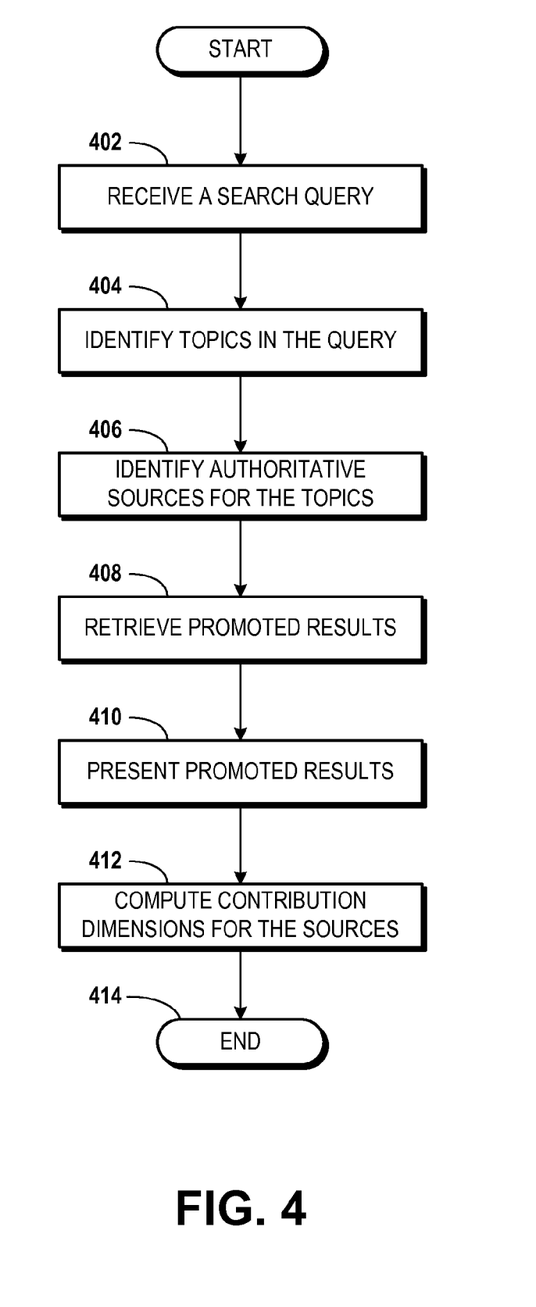
FIG. 4 is a flow diagram showing aspects of a method for dynamically reranking search results based upon source authority, according to an exemplary embodiment of the present disclosure.

Turning now to FIG. 4, a method 400 for dynamically reranking search results 114 based upon author authority will be described in detail. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can be ended at any time and need not be performed in its entirety. Some or all operations of the methods, and/or substantially equivalent operations, can be performed by execution of computer-readable instructions included on a computer-storage media, as defined above. The term "computer-readable instructions," and variants thereof, as used in the description and claims, is used expansively hereinto include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states operations, structural devices, acts, or modules. These operations, structural devices, acts, and modules may be implemented in software, in firmware, in special purpose digital logic, and any combination thereof.

For purposes of illustrating and describing the concepts of the present disclosure, the methods disclosed herein are described as being performed by the authority server 112, though it will be understood that the authority server 112 can provide the functionality described herein by execution of the search engine 116, the authority engine 118, and/or the ranking engine 120. Thus, the described embodiments are merely exemplary and should not be viewed as being limiting in any way.

The method 400 begins at operation 402, wherein the authority server 112 receives a query 122 from an entity. The query 122 can include a search string entered by a user at a computer 110 that communicates with the authority server 112 via a search engine such as, for example, the BING search engine by MICROSOFT CORPORATION. The search string can include natural language phrases, specific keywords, topics, and the like.

From operation 402, the method 400 proceeds to operation 404, wherein the authority server 112 analyzes the query 122 to identify one or more topics in the query 122. To provide this functionality, the authority server 112, or the search engine 116, can leverage query 122 alteration technology to perform spelling variation searches, to normalize various terms and/or phrases in the query 122, to identify singular and plural forms of various terms and/or phrases in the query 122, and the like.

From operation 404, the method 400 proceeds to operation 406, wherein the authority server 112 determines authoritative sources 102 for the topics identified in the operation 404. The authority server 112 determines which of the topics identified in the operation 404 are represented in the authority index 128. As explained above, the authority server 112 can search the authority index 128 to identify sources 102 that are associated with content 104 that references one or more of the topics identified in the operation 404. If the authority server 112 determines that one or more of the topics identified in the operation 404 are represented in the authority index 128, the authority server 112 identifies promoted result records 314, e.g., by building a dataset of the identified sources 102, as explained above with reference to FIGS. 3B and 3C. As explained above, the promoted result records 314 can include the source data 202, the topic data 204, the authority data 206, the POV data 208, the time data 210, location data 212, and/or the other data 214.

From operation 406, the method 400 proceeds to operation 408, wherein the authority server 112 retrieves the promoted result records 314 identified in the operation 406, as described above with reference to FIGS. 3B and 3C. From operation 408, the method 400 proceeds to operation 410, wherein the authority server 112 dynamically presents the promoted result records 314. As explained above, the authority server 112 can inject the promoted result records 314 into the search results 114 according to desired criteria, or can inject the promoted result records 314 into the search results 114 based upon input received from a user.

From operation 410, the method 400 proceeds to operation 412, wherein the authority server 112 dynamically computes contribution dimensions of the identified sources 102 and/or the promoted result records 314. As explained above, the contribution dimensions can be based upon, for example, source data 202, topic data 204, POV data 206, authority data 208, time data 210, location data 212, other data 214, or additional data included in the promoted result records 314. Contribution dimension filters can be generated based upon any of the data described herein.

The authority server 112 can determine the contribution dimensions and generate the contribution dimension filters. The contribution dimension filters can be displayed to a user with the search results 114. The user also can manipulate the search results 114 and/or the promoted result records 314 by activating or deactivating the contribution dimension filters, e.g., through UI controls selectable on or through a results page. Manipulation of the contribution dimension filters by a user allows the user to retrieve and rerank search results 114 across a number of contribution dimensions associated with the promoted result records 314, as explained above. A user can select, deselect, rank, rerank, weight, and/or remove the contribution dimension filters from consideration via a user interface ("UI") with the authority server 112.

The contribution dimension filters can be used by a searching entity to obtain faceted search functionality. Depending upon a searching entity's needs or preferences, the entity can narrow down or rerank the search results 114 based upon a desired search facet, which may include the above-described contribution dimensions as well as other facets. It will be appreciated that the authority server 112 can make explicit and/or implicit use of authority associated with sources 102 to rank and/or rerank the search results 114. An example of an explicit use of authority associated with sources 102 includes the presentation of contribution dimension filters and manipulating the search results 114 in response to manipulation of the filters by a searching entity. Other explicit uses, e.g., presenting the facets of authority used to rank the search results 114, are contemplated. An example of an implicit use of authority associated with sources 102 includes the ranking and/or reranking of search results 114 by the ranking engine 120 based upon criteria or preferences, as explained above. Other implicit uses of authority associated with the sources 102 to rerank search results 114 are contemplated. The method 400 ends at operation 414.

In some embodiments, the authority server 112, and/or one or more components thereof, is configured to receive feedback on how the provided search results 114 and/or promoted results 124 are used, filtered, or consumed by users, systems, or entities ("feedback data"). The feedback data is illustrated in FIG. 2 as part of the other data 214. The authority server 112 can be provided with a feedback loop capability, via which the authority server 112 can receive usage, filtering, consumption information, and/or other feedback data. The authority server 112 can use the feedback data to improve how the authority server 112 computes, provides, ranks, and/or filters information on the basis of authority. For example, the feedback data can be used to filter results, to computer authority scores, and/or for other purposes as described herein.

For example, a user may search for articles on economics and may be provided with articles authored by two authoritative sources. Via the feedback loop, the authority sever 112 can receive feedback data indicating that economics articles from the first source are consumed more often than articles from the second source, that users filter on the basis of one or both sources, and the like. The feedback data can be used by the authority server 112 for determining authority, ranking authoritative sources, and/or filtering search results 114 and/or promoted results 124, as well as for other purposes such as tracking.

Figure 5:
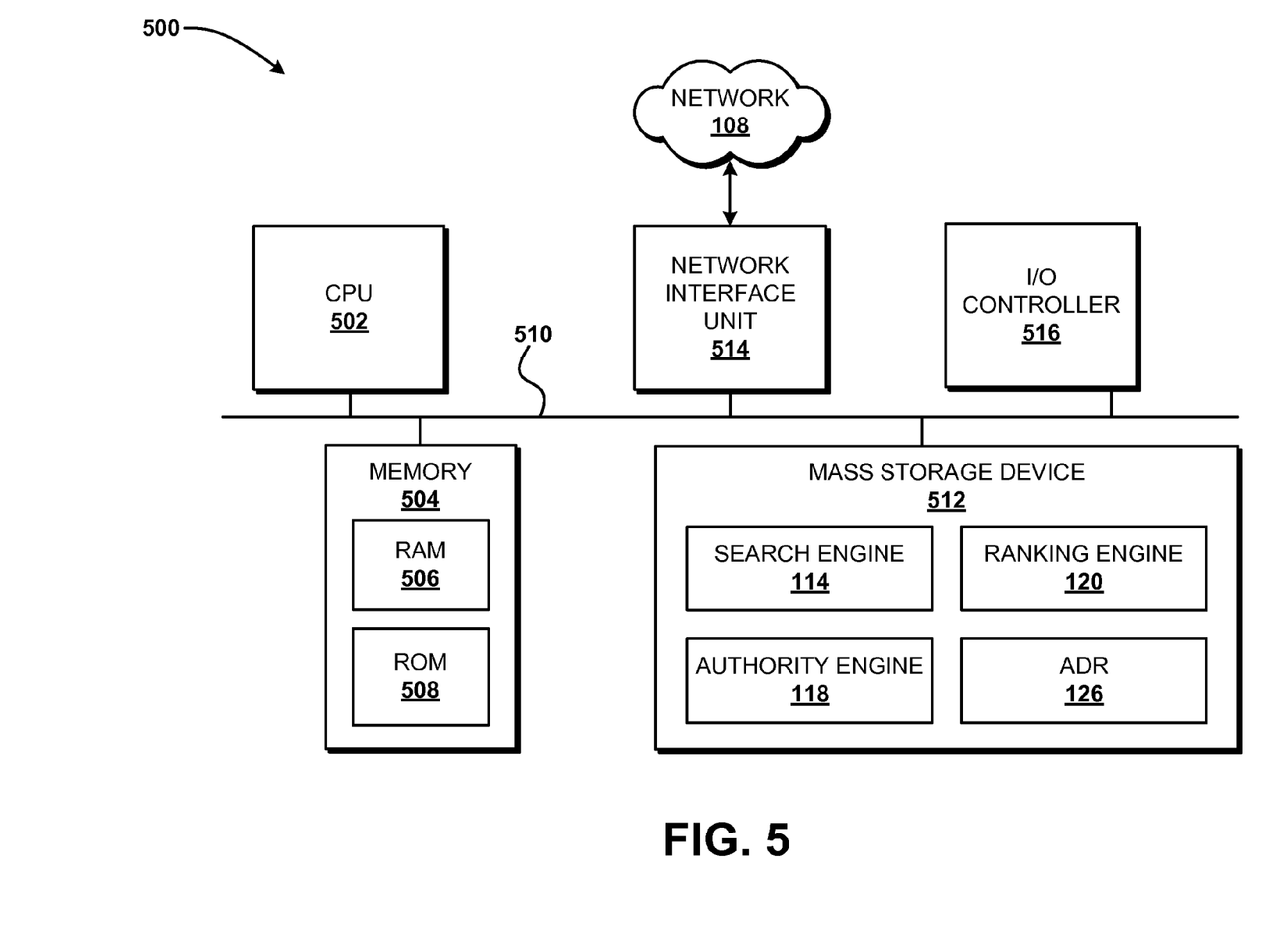
FIG. 5 is a computer architecture diagram illustrating an exemplary computer hardware and software architecture for a computing system capable of implementing aspects of the embodiments presented herein.

FIG. 5 illustrates an exemplary computer architecture 500 for an authority server 112 capable of executing the software components described herein for dynamically reranking search results 114 based upon source authority as described above. The computer architecture 500 illustrated in FIG. 5 illustrates a conventional server, desktop, and/or laptop computer, and may be utilized to execute any aspects of the software components presented herein, including the search engine 116, the authority engine 118, and/or the ranking engine 120.

The computer architecture 500 illustrated in FIG. 5 includes a central processing unit 502 ("CPU"), a system memory 504, including a random access memory 506 ("RAM") and a read-only memory ("ROM") 508, and a system bus 510 that couples the memory 504 to the CPU 502. A basic input/output system containing the basic routines that help to transfer information between elements within the computer architecture 500, such as during startup, is stored in the ROM 508. The computer architecture 500 further includes a mass storage device 512 for storing an operating system (not illustrated), and application programs, e.g., the search engine 116, the authority engine 118, and the ranking engine 120.

The mass storage device 512 is connected to the CPU 502 through a mass storage controller (not shown) connected to the bus 510. The mass storage device 512 and its associated computer-readable media provide non-volatile storage for the computer architecture 500. Although the description of computer-readable media contained herein refers to a mass storage device, such as a hard disk or CD-ROM drive, it should be appreciated by those skilled in the art that computer-readable media can be any available computer storage media that can be accessed by the computer architecture 500.

By way of example, and not limitation, computer-readable storage media may include volatile and non-volatile, removable and non-removable media implemented in any method or technology for storage of information such as computer-readable instructions, data structures, program modules or other data. For example, computer-readable media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 500.

According to various embodiments, the computer architecture 500 may operate in a networked environment using logical connections to remote computers through a network such as the network 108. The computer architecture 500 may connect to the network 108 through a network interface unit 514 connected to the bus 510. It should be appreciated that the network interface unit 514 also may be utilized to connect to other types of networks and remote computer systems, for example, the ADR 126. The computer architecture 500 also may include an input/output controller 516 for receiving and processing input from a number of other devices, including a keyboard, mouse, or electronic stylus (not shown in FIG. 5). Similarly, the input/output controller 516 may provide output to a display screen, a printer, or other type of output device (also not shown in FIG. 5).

As mentioned briefly above, a number of program modules and data files may be stored in the mass storage device 512 and RAM 506 of the computer architecture 500, including an operating system suitable for controlling the operation of the server, desktop, and/or laptop computer. The mass storage device 512 and RAM 506 also may store other types of program modules and data, including the authority index 128 described above.

It should be appreciated that the software components described herein may, when loaded into the CPU 502 and executed, transform the CPU 502 and the overall computer architecture 500 from a general-purpose computing system into a special-purpose computing system customized to facilitate the functionality presented herein. The CPU 502 may be constructed from any number of transistors or other discrete circuit elements, which may individually or collectively assume any number of states. More specifically, the CPU 502 may operate as a finite-state machine, in response to executable instructions contained within the software modules disclosed herein. These computer-executable instructions may transform the CPU 502 by specifying how the CPU 502 transitions between states, thereby transforming the transistors or other discrete hardware elements constituting the CPU 502.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 500 in order to store and execute the software components presented herein. It also should be appreciated that the computer architecture 500 may include other types of computing devices, including hand-held computers, embedded computer systems, personal digital assistants, and other types of computing devices known to those skilled in the art. It is also contemplated that the computer architecture 500 may not include all of the components shown in FIG. 5, may include other components that are not explicitly shown in FIG. 5, or may utilize an architecture completely different than that shown in FIG. 5.

Based on the foregoing, it should be appreciated that technologies for dynamically reranking search results based upon source authority have been disclosed herein. Although the subject matter presented herein has been described in language specific to computer structural features, methodological and transformative acts, specific computing machinery, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

We claim:

1. A computer-implemented method for dynamically reranking search results based upon source authority, the computer-implemented method comprising performing computer-implemented operations for:
   analyzing a received search query to determine a query topic associated with the search query;
   searching an authority index to identify authoritative sources relating to the query topic, the authority index comprising a plurality of entries, wherein each entry defines an authoritative source for content relating to the query topic, wherein identifying the authoritative sources comprises:
   accessing an authority index;
   searching the authority index for entries associated with the query topic;
   identifying a plurality of entries associated with the query topic, each of the plurality of entries being associated with a source having a corresponding authority value and corresponding to one of the promoted results, and
   defining the authoritative sources as the sources that authored the promoted results;
   obtaining, from the authority index, promoted results identifying the content relating to the query topic;
   computing at least one contribution dimension for the sources associated with the promoted results;
   generating a contribution dimension filter for filtering the promoted results and the search result based upon the contribution dimension; and
   dynamically reranking the promoted results and the search result based upon the contribution dimension in response to receiving input indicating a command to apply the contribution dimension filter to the promoted results and the search result; and
   outputting the reranked promoted results with the search result.

2. The method of claim 1, further comprising computing at least one contribution dimension for the sources associated with the promoted results.

3. The method of claim 2, wherein the contribution dimension filter is configured to manipulate the promoted results and the search result based upon the contribution dimension.

4. The method of claim 3, wherein the contribution dimension comprises source data identifying the source,
   point of view data identifying a point of view associated with the sources and the query topic, and
   authority data identifying authority values associated with the sources, the query topic, and the point of view associated with the promoted results.

5. The method of claim 3, wherein the contribution dimension comprises source data identifying the sources,
   time data comprising a time associated with the promoted results, and
   authority data identifying authority values associated with the sources, the query topic, and the time data.

6. The method of claim 3, wherein the contribution dimension comprises source data identifying the sources,
   location data comprising locations associated with the promoted results, and
   authority data identifying authority values associated with the sources, the query topic, and the location data.

7. The method of claim 1, wherein identifying the authoritative sources associated with query topic comprises:
   accessing an authority index comprising entries, each of the entries comprising source data indicating a source, topic data indicating a topic, and authority data indicating an authority associated with the source and the topic;
   searching the authority index for entries associated with the query topic, each of the entries comprising one of the promoted results;
   obtaining a plurality of promoted results; and
   ranking the plurality of promoted results and the search result based upon a contribution dimension associated with the promoted results.

8. The method of claim 7, wherein each of the entries further comprises time data indicating a time associated with the entry, and wherein ranking the plurality of promoted results and the search result comprises ranking the plurality of promoted results and the search result based upon the time data.

9. The method of claim 7, wherein each of the entries further comprises location data indicating a geographic location associated with the entry, and wherein ranking the plurality of promoted results and the search result comprises ranking the plurality of promoted results and the search result based upon the location data.

10. A computer-implemented method for dynamically reranking search results based upon source authority, the computer-implemented method comprising performing computer-implemented operations for:
   analyzing a received search query to determine a query topic associated with the search query;
   performing a search on an authority index utilizing the search query and generating search results to identify authoritative sources relating to the query topic, the authority index comprising a plurality of entries, wherein each entry defines an authoritative source for content relating to the query topic, wherein identifying the authoritative sources comprises,
   accessing the authority index comprising a plurality of entries, each entry defining an authoritative source that created for content relating to a plurality of query topics,
   searching the authority index to identify authoritative sources for content related to the query topic, each authoritative source associated with a promoted result relating to the query topic,
   identifying a plurality of entries associated with the query topic, each of the plurality of entries being associated with a source have a corresponding authority value and corresponding to one of the promoted results, and
   defining the authoritative sources as the sources that authored the promoted results;
   obtaining the promoted results in response to the searching;
   computing at least one contribution dimension for the sources associated with the promoted results;
   generating a contribution dimension filter for filtering the promoted results and the search result based upon the contribution dimension; and
   dynamically reranking the promoted results and the search result based upon the contribution dimension in response to receiving input indicating a command to apply the contribution dimension filter to the promoted results and the search result; and
   outputting the reranked promoted results with the search result.

11. The method of claim 10, wherein each of the contribution dimension filters is configured to manipulate the promoted results and the search results based upon a one of the contribution dimensions.

12. The method of claim 10, wherein the contribution dimension filters comprise
   source data identifying sources associated with the promoted results,
   point of view data identifying points of view associated with the promoted results, and authority data identifying authority values associated with the promoted results.

13. The method of claim 10, wherein outputting the reranked promoted results and the search results further comprises outputting data corresponding to a link for content associated with the promoted results.

14. An optical disk, a magnetic disk storage device, or a solid state storage device having computer-readable instructions stored thereupon that, when executed by a computer, cause the computer to:
   analyze a search query to determine a query topic associated with the search query;
   perform a search on an authority index to generate search results to identify authoritative sources relating to the query topic, the authority index comprising a plurality of entries, wherein each entry defines an authoritative source for content relating to the query topic, wherein identifying the authoritative sources comprises,
   access the authority index comprising a plurality of entries, each entry defining an authoritative source that created for content relating to a plurality of query topics,
   search the authority index to identify authoritative sources for content related to the query topic, each authoritative source associated with a promoted result relationg to the query topic, and
   identify a plurality of entries associated with the query topic, each of the plurality of entries being associated with a source have a corresponding authority value and corresponding to one of the promoted results, and
   obtain from the authority index, the promoted results identifying the content relating to the query topic in response to the searching;
   compute contribution dimensions for the authoritative sources associated with the promoted results;
   generate contribution dimension filter for filtering the promoted results and the search result;
   dynamically rerank the promoted results and the search result based upon the contribution dimension in response to receiving input indicating a command to apply the contribution dimension filter to the promoted results and the search result;
   outputting the reranked promoted results and the search result;
   receive input indicating selection of a one of the contribution dimension tilters;
   rerank the search results and the promoted results based upon the selected contribution dimension filter; and
   receive feedback data relating to how the search results or the promoted results are used, consumed, or filtered.

15. The optical disk, a magnetic disk storage device, or a solid state storage device of claim 14, wherein the authority index comprises an authority table including the entries, wherein the authority table includes a pseudoURL describing the content, and wherein the authority table links a source that authored the content described by the pseudoURL, an authority value associated with the source, and a point of view of the source.

* * * * *